US009652230B2

(12) United States Patent
Godard et al.

(10) Patent No.: US 9,652,230 B2
(45) Date of Patent: May 16, 2017

(54) COMPUTER PROCESSOR EMPLOYING DEDICATED HARDWARE MECHANISM CONTROLLING THE INITIALIZATION AND INVALIDATION OF CACHE LINES

(71) Applicant: Mill Computing, Inc., Palo Alto, CA (US)

(72) Inventors: Roger Rawson Godard, East Palo Alto, CA (US); Arthur David Kahlich, Sunnyvale, CA (US); Norman Hardy, Portola Valley, CA (US); Allen Jay Baum, Palo Alto, CA (US)

(73) Assignee: Mill Computing, Inc., Palo Alto, CA (US)

( * ) Notice: Subject to any disclaimer, the term of this patent is extended or adjusted under 35 U.S.C. 154(b) by 168 days.

(21) Appl. No.: 14/515,231

(22) Filed: Oct. 15, 2014

(65) Prior Publication Data
US 2015/0106566 A1    Apr. 16, 2015

Related U.S. Application Data

(60) Provisional application No. 61/890,891, filed on Oct. 15, 2013.

(51) Int. Cl.
| | |
|---|---|
| *G06F 9/30* | (2006.01) |
| *G06F 12/0893* | (2016.01) |
| *G06F 12/0811* | (2016.01) |
| *G06F 12/0864* | (2016.01) |
| *G06F 12/02* | (2006.01) |
| *G06F 12/1027* | (2016.01) |
| *G06F 12/1009* | (2016.01) |

(Continued)

(52) U.S. Cl.
CPC ...... *G06F 9/30032* (2013.01); *G06F 9/30145* (2013.01); *G06F 12/0292* (2013.01); *G06F 12/0811* (2013.01); *G06F 12/0864* (2013.01); *G06F 12/0893* (2013.01); *G06F 12/1027* (2013.01); *G06F 12/0897* (2013.01); *G06F 12/1009* (2013.01); *G06F 17/30286* (2013.01); *G06F 2212/1024* (2013.01); *G06F 2212/1028* (2013.01); *G06F 2212/283* (2013.01); *G06F 2212/608* (2013.01); *G06F 2212/6032* (2013.04); *G06F 2212/684* (2013.01); *Y02B 60/1225* (2013.01)

(58) Field of Classification Search
CPC .................. G06F 12/0893; G06F 2212/608
See application file for complete search history.

(56) References Cited

U.S. PATENT DOCUMENTS

| | | | |
|---|---|---|---|
| 6,026,485 A | 2/2000 | O'Connor et al. | |
| 6,385,697 B1 * | 5/2002 | Miyazaki | G06F 12/122 |
| | | | 711/128 |

(Continued)

*Primary Examiner* — Ryan Bertram
(74) *Attorney, Agent, or Firm* — Gordon & Jacobson, P.C.

(57) ABSTRACT

A computer processing system includes execution logic that generates memory requests that are supplied to a hierarchical memory system. The computer processing system includes a hardware map storing a number of entries associated with corresponding cache lines, where each given entry of the hardware map indicates whether a corresponding cache line i) currently stores valid data in the hierarchical memory system, or ii) does not currently store valid data in hierarchical memory system and should be interpreted as being implicitly zero throughout.

20 Claims, 8 Drawing Sheets

(51) Int. Cl.
G06F 17/30 (2006.01)
G06F 12/0897 (2016.01)

(56) References Cited

U.S. PATENT DOCUMENTS

| | | | |
|---|---|---|---|
| 6,434,677 | B1 | 8/2002 | Breuder et al. |
| 6,601,235 | B1 | 7/2003 | Holzle et al. |
| 6,725,341 | B1* | 4/2004 | Peir .................... G06F 12/0831 711/117 |
| 7,428,615 | B2 | 9/2008 | Van Eijndhoven |
| 2003/0023814 | A1* | 1/2003 | Barroso ............. G06F 12/0826 711/122 |
| 2010/0199024 | A1* | 8/2010 | Jeong ................. G06F 12/0246 711/103 |
| 2012/0221774 | A1 | 8/2012 | Atkisson et al. |
| 2013/0139007 | A1* | 5/2013 | Higo .................. G06F 11/1666 714/54 |
| 2014/0164708 | A1* | 6/2014 | Breternitz, Jr. ..... G06F 12/0875 711/132 |
| 2014/0344522 | A1* | 11/2014 | Fan .................... G06F 12/0833 711/128 |
| 2015/0127911 | A1* | 5/2015 | Steiss ................. G06F 12/0871 711/123 |
| 2016/0026579 | A1* | 1/2016 | Samanta ............ G06F 12/0893 711/136 |

\* cited by examiner

COMPUTER PROCESSOR EMPLOYING DEDICATED HARDWARE MECHANISM CONTROLLING THE INITIALIZATION AND INVALIDATION OF CACHE LINES

CROSS-REFERENCE TO RELATED APPLICATIONS

The present disclosure claims priority from U.S. Provisional Patent Appl. No. 61/890,891, filed on Oct. 15, 2013, entitled "Cache Support for a Computer Processor," herein incorporated by reference in its entirety.

BACKGROUND

1. Field

The present disclosure relates to computer processors (also commonly referred to as CPUs).

2. State of the Art

A computer processor (and the program which it executes) needs places to put data for later reference. A computer processor design will typically have many such places, each with its own trade off of capacity, speed of access, and cost. Usually these are arranged in a hierarchal manner referred to as the memory system of the processor, with small, fast, costly places used for short lived and/or frequently used small data and large, slow and cheap places used for what doesn't fit in the small, fast, costly places. The memory system typically includes the following components arranged in order of decreasing speed of access:
- register file or other form of fast operand storage;
- one or more levels of cache memory (one or more levels of the cache memory can be integrated with the processor (on-chip cache) or separate from the processor (off-chip cache);
- main memory (typically implemented by DRAM memory and/or NVRAM memory and/or ROM);
- controller card memory; and
- on-line mass storage (typically implemented by one or more hard disk drives).

In many computer processors, the main memory of the memory system can take several hundred cycles to access. The cache memory, which is much smaller and more expensive but with faster access as compared to the main memory, is used to keep copies of data that resides in the main memory. If a reference finds the desired data in the cache (a cache hit) it can access it in a few cycles instead of several hundred when it doesn't (a cache miss). Because a program typically cannot do anything while waiting to access data in memory, using a cache and making sure that desired data is copied into the cache can provide significant improvements in performance.

A large part of the memory traffic of an executing program stems from memory accesses to the stack frame of the currently executing function, or, via pointer arguments, to a few of the immediately surrounding frames. Of this traffic, many accesses are initializations of frame local variables with zero.

Because of the high frequency of access, the referenced memory of the current stack frame tends to be resident in the top level data cache. When the current function exits, its entire stack frame is invalid and the corresponding lines are meaningless. Because the invalidated lines have been written to, the cache has marked them as dirty and subject to write-back in a write-back cache structure, even though the values contained are meaningless.

If a line not in any cache is written to in a write-allocate cache design then the cache experiences a write miss, which causes the rest of the line to be read in from memory, be merged with the written data in a write buffer, and the result copied into the cache. Reads caused by write-misses consume power and memory bandwidth, and write buffers are expensive resources.

While the frame of an exited function is no longer valid in the program, the memory it had occupied still resides in the cache and can be read by an accidental or contrived wild address. This permits browsing in the detritus of called functions, a potential source of insecurity and exploits.

It is not uncommon for a program to contain a bug by which it will read and use a value that has never been initialized. The read of the initialized value will often be from stack frame locations of previously exited functions. In this case, the read receives the most recent value that happened to reside at the read address, which may vary from run to run of the program. The resulting failures tend to be difficult to reproduce and debug.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor for use with a hierarchical memory system. The computer processor includes execution logic that generates memory requests that are supplied to the hierarchical memory system. The execution logic (and/or possibly other parts of the computer processing system) includes a hardware map storing a number of entries associated with corresponding cache lines, where each given entry of the hardware map indicates whether a corresponding cache line i) currently stores valid data in the hierarchical memory system or ii) does not currently store valid data in the hierarchical memory system and should be interpreted as having an implicit zero value throughout.

The memory requests can include a load request specifying a requested cache line. The hardware map can be accessed before issuing the load request to cache or a lower level of the hierarchical memory system in order to determine if the hardware map includes an entry that corresponds to the requested cache line of the load request. Such entry corresponding to the requested cache line of the load request can be processed to determine whether the requested cache line i) currently stores valid data in the hierarchical memory system or ii) does not currently store valid data in the hierarchical memory system and should be interpreted as having an implicit zero value throughout. In the event that the processing determines that the requested cache line does not currently store valid data in the hierarchical memory system and should be interpreted as having an implicit zero value throughout, a cache line with a zero value for one or more data bytes can be returned to the execution logic without accessing the hierarchical memory system and the issuance of the load request to the hierarchical memory system can be avoided.

The memory requests can include a store request specifying a requested cache line along with one or more operand data bytes for storage in the requested cache line. The hardware map can be accessed before issuing the store request to the hierarchical memory system in order to determine if the hardware map includes an entry that corresponds to the requested cache line of the store request. Such entry corresponding to the requested cache line of the store request can be processed to determine whether the requested cache line i) currently stores valid data in the hierarchical memory system or ii) does not currently store valid data in the hierarchical memory system and should be interpreted as having an implicit zero value throughout. In the event that the processing determines that the requested cache line does not currently store valid data in the hierarchical memory system and should be interpreted as having an implicit zero value throughout, a new cache line is written into the hierarchical memory system. The new cache line can include the operand data bytes specified by the store request together with zero value data bytes for those data bytes of the cache line not specified by the store request. The issuance of the store request to the hierarchical memory system can also be avoided.

The cache lines corresponding to certain entries of the hardware map can store frame-local operand data for the current stack frame (i.e., the stack frame of the current function frame activation). During an allocation process associated with the current function frame activation, one or more entries of the hardware map that corresponds to cache lines that store frame-local operand data for the stack frame of the current function frame activation can be initialized to indicate that such cache lines do not currently store valid data in the hierarchical memory system and should be interpreted as having an implicit zero value throughout. In the event that the number cache lines that store frame-local operand data for the stack frame of the current function frame activation exceeds the maximum number of entries of the hardware map that can be allocated for the current function frame activation, each excess cache line can be written to the cache of the hierarchical memory system with a zero value throughout. The hardware map can be accessed before issuing any given memory request to the cache or lower level of the hierarchical memory system as part of a function frame activation in order to determine if the hardware map includes an entry that corresponds to the requested cache line of the given memory request. The hardware map can also be accessed when terminating the function frame activation in order to identify one or more cache lines that currently store valid frame-local operand data for the function frame activation. The identified one or more cache lines can be invalidated within the hierarchical memory system when terminating the function frame activation. Any pending write-back of the identified one or more cache lines within the hierarchical memory system can be cancelled when terminating the function frame activation.

In one embodiment, the entries of the hardware map can each comprise a single bit associated with a corresponding cache line.

DETAILED DESCRIPTION OF THE PREFERRED EMBODIMENTS

Figures 1, 2:
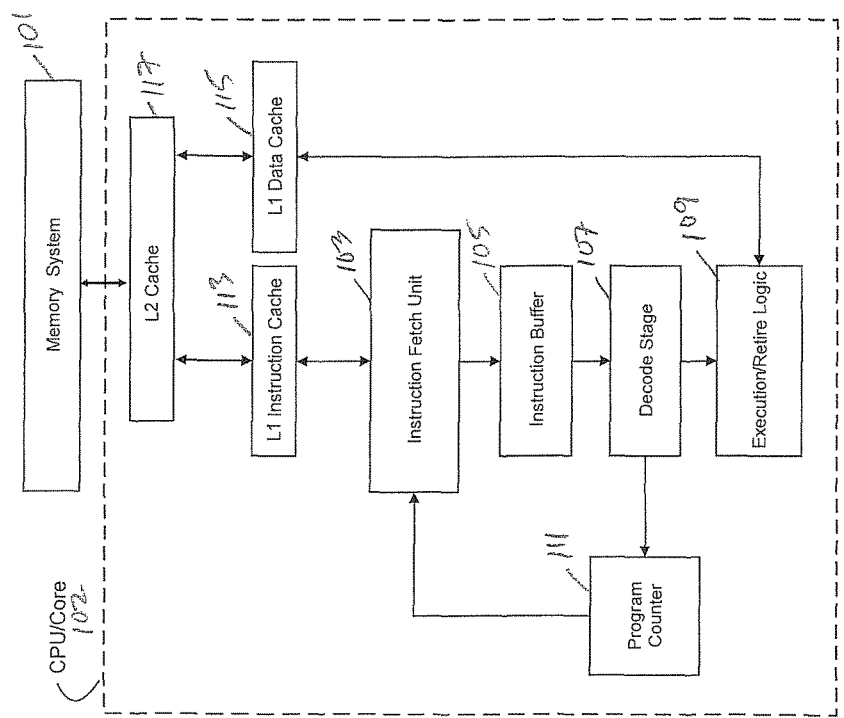
FIG. 1 is a schematic block diagram of a computer processing system according to an embodiment of the present disclosure.
FIG. 2 is a schematic diagram of exemplary pipeline of processing stages that can be embodiment by the computer processor of FIG. 1.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is logically organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

The term "function" (also commonly referred to as a "subroutine" or "procedure") refers to a sequence of program instructions that perform a specific task, packaged as a unit. This unit can then be used in programs wherever that particular task should be performed. Functions may be defined within programs, or separately in libraries that can be used by multiple programs. A function behaves in much the same way as a computer program that is used as one step in a larger program or another function. A function is often coded so that it can be started (called) several times and/or from several places during one execution of the program, including from other functions, and then terminates by returning back to the next instruction after the call once the task of the function is done.

The term "function frame activation" is an instance of a function which is active and currently executing and has not yet terminated.

The term "data stack" is a stack data structure maintained by a processor that stores information about one or more function frame activations. Such information can include the return address of a function frame activation (i.e., the address to return back to once the task of the function frame activation is done), operand data (such as variables and constants) that are local to the function frame activation, incoming parameters or arguments passed into the function frame activation, and outgoing parameters or arguments passed out of the function frame activation.

The term "stack frame" is part of a data stack that stores information about a particular function frame activation. Thus, the data stack can be organized as a number of stack frames each corresponding to a particular function frame activation in an executing program.

The term "frame-local operand data" refers to operand data (such as variables and constants) that is part of a stack frame for a particular function frame activation and local to the particular function frame activation. Such frame-local operand data is known only within the particular function frame activation and does not retain its value after the particular function frame activation terminates.

The computer processing system of the present application employs a dedicated hardware mechanism for allocating, initializing and deallocating cache lines storing frame-local operand data. The hardware mechanism is configured such that cache lines storing frame-local operand data are pre-initialized with zeros before access to cache or a lower level of the memory hierarchy. New cache lines storing frame local operand data are wholly occupied when initially written into cache. And cache lines storing frame-local operand data are invalidated and discarded without write-back when the corresponding function frame activation terminates.

The dedicated hardware mechanism can include a hardware map (which is referred to herein as the Implicit Zero Map or IZM)) in which each given entry (which can one bit in size) corresponds or maps to a cache line storing frame-local operand data, where the mapped cache lines cover the address range that stores frame-local operand data for the current function frame activation (i.e., the frame-local operand data for the top stack frame). The IZM can store a fixed maximum number of entries (e.g., bits), and thus cache lines it maps may comprise an address region that is greater than or less than the size of the frame-local operand data of the top stack frame. If the address region of the cache lines storing frame-local operand data of the top stack frame is greater than the fixed size of the IZM, then a portion of such address region is not mapped by the entries (e.g. bits) of the IZM. Otherwise, all cache lines storing frame-local operand data of the top stack frame are mapped by the entries (e.g., bits) of the IZM, and possibly all or a part of the cache lines for some lower stack frame or frames can be mapped by the entries (e.g., bits) of the IZM.

The entries (e.g., bits) of the IZM each correspond to a cache line storing frame-local operand data and provides an indication whether the corresponding cache line i) currently stores valid data in the memory hierarchy of the computer processing system and thus has a meaningful physical existence in the cache or lower level of the memory hierarchy, or ii) does not currently store valid data in the memory hierarchy and should be interpreted as being implicitly zero throughout. In one embodiment, if an IZM entry (e.g., bit) is clear, then the corresponding cache line is interpreted as currently storing valid data in cache or a lower level of the memory hierarchy of the computer processing system (and thus has a meaningful existence in cache and lower level of the memory hierarchy). However, if an IZM entry (e.g., bit) is set, then the corresponding cache line is interpreted as not currently storing valid data in cache or lower level of the memory hierarchy (and thus not having a meaningful physical existence in cache or a lower level of the memory hierarchy); instead the corresponding cache line is interpreted as being implicitly zero throughout.

Each memory request generated in a function frame activation is checked against the entries of the IZM to determine whether the effective address of the memory request is within the address range covered by the entries of the IZM. In the event that the effective address of the memory request is outside the range covered by the entries of the IZM, the memory request proceeds as normal to access the cache or a lower level of the hierarchical memory system without interference. In the event that the effective address of the memory request falls within the range covered by the entries of the IZM, the effective address of the memory request is converted into a corresponding IZM address into the IZM. Where "base+displacement" addressing is employed for specifying frame-local operand data, such conversion can involve subtracting the effective address of the memory request from the base address of the IZM-covered region for the current function frame activation and then scaling the result by the width of a cache line. The IZM address selects the IZM entry (e.g., bit) corresponding to the addressed cache line.

If the selected IZM entry (e.g., bit) is clear (e.g., it indicates that the cache line currently stores valid data in cache or a lower level of the memory hierarchy of the computer processing system and thus has a meaningful physical existence in the cache and lower level(s) of the memory hierarchy of the computer processing system), then the IZM outputs a "miss" signal which allows the memory request to proceed as normal to access the hierarchical memory system without interference.

If the selected IZM entry (e.g., bit) is set and the memory request is a load request, then the hardware outputs a zero value for one or more data bytes of the requested cache line for return to the processor, exactly as if the cache line with all zeroed data bytes had been read from cache or memory, but without any cache or memory access. Because such a load operation returns one or more zeroed data bytes for the cache line without examining the underlying memory, it is not possible to browse for former values in the address range covered by the IZM. In consequence of this behavior, the compilers or other tools that generate code may be altered such that initialization of frame-local operand data with zero is omitted, leading to faster and more compact code.

If the selected IZM entry (e.g., bit) is set and the memory request is a store request, then the hardware write the cache line into the hierarchical memory system by writing the data bytes of the cache line as specified by the store request into the hierarchical memory system with zeroed data values for any data bytes that are not specified by the store request. In this manner, the stored value is written to hierarchical memory system as would be performed normally, but with the entire rest of the containing cache line set to zero as if it had been written by one or more store requests writing zeros to the cache line. In addition, the selected IZM entry (e.g., bit) is cleared. A cache line can be displaced by writing the cache line as specified by the store request. In a write-allocate cache structure it is not necessary to allocate a write buffer or read the rest of the line from memory because the whole line has a new valid value. Moreover, write misses to cache lines covered by the IZM are impossible.

The above description outlines the steady state where the IZM covers cache lines storing frame-local operand data for the top stack frame. To establish this steady state, the hardware includes a mechanism that tracks the allocation and deallocation of stack frames. If the instruction set of the processing system defines explicit CALL and RETURN operations that perform frame allocation and deallocation then maintaining the IZM can be incorporated into those operations. If frame allocation and deallocation is a consequence of register manipulation by explicit code then the instruction set may be augmented with operations to inform the IZM of the changing frame structure.

In the event of the allocation of new stack frame (corresponding to a new function frame activation), the IZM is altered to reflect the new stack frame. Registers that indicate the address range covered by the IZM can be adjusted to indicate the address range for the new stack frame. The entry(ies) (e.g., bit(s)) of the IZM that cover this new address range are set to indicate that the corresponding cache lines do not currently store valid data in cache or a lower level of the memory hierarchy of the computer processing system and should be interpreted as being implicitly zero throughout. The same number of entries (e.g., bits) can be removed from the opposite end of the IZM so that the IZM continues to map the same amount of memory, merely at a different address. The removed entries are examined to determine if they are sets, corresponding to lines that are implicitly zero but are no longer mapped by the IZM. Each of those lines can be written into the hierarchical memory system by writing zeroed data bytes for all data bytes of the corresponding cache line into the hierarchical memory system.

In the event of a stack frame deallocation (corresponding to the termination of the current function frame activation), the IZM is altered to reflect the revised frame structure. The registers that indicate the address range covered by the IZM can be adjusted to indicate the return address of the current function frame activation. The entry(ies) (e.g., bit(s)) of the IZM that cover the function frame activation which is being deallocated are removed from the IZM and processed entry-by-entry to determine if the respective entry is clear. If so, the cache line corresponding to the respective cleared entry is invalidated in the hierarchical memory system, thus discarding this cache line. Furthermore, any pending write-back of the cache line can be cancelled. This prevents unnecessary spurious write-back of invalid data. If the address range of the cache lines occupied by the deallocated stack is larger than the region that can be covered by the IZM, then each excess cache line not covered by the IZM is invalidated in the hierarchical memory system as part of the deallocation of the task, thus discarding such excess cache line. Furthermore, any pending write-back of the excess cache line can be cancelled.

In accordance with the present disclosure, a sequence of instructions is stored in the memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution/retire logic 109 that are arranged in a pipeline manner as shown. The CPU (or Core) 102 also includes at least one program counter (one shown as 111), at least one L1 instruction cache (one shown as 113), an L1 data cache 115 and a shared instruction/data L2 Cache 117.

The L1 instruction cache 113, the L1 data cache 115 and the L2 cache are logically part of the hierarchy of the memory system 101. The L1 instruction cache 113 is a cache memory that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache memory that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The shared L2 Cache 117 stores both instructions and data. The L2 cache 117 can be organized as a set-associative cache structure, a fully associative cache structure, or a direct mapped cache structure as is well known in the art. The hierarchy of the memory system 201 can also include additional levels of cache memory, such as a level 3 cache, as well as main memory. One or more of these additional levels of the cache memory can be integrated with the CPU 202 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the return address of a function frame activation in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111.

The L1 instruction cache 113 services this request (possibly accessing lower levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer 105 for storage therein.

The decode stage 107 is configured to decode one or more instructions stored in the instruction buffer 105. Such decoding generally involves parsing and decoding the bits of the instruction to determine the type of operation(s) encoded by the instruction and generate control signals required for execution of the operation(s) encoded by the instruction by the execution/retire logic 109.

The execution/retire logic 109 utilizes the results of the decode stage 107 to execute the operation(s) encoded by the instructions. The execution/retire logic 109 can send a load request to the L1 data cache 115 to fetch data from the L1 data cache 115 at a specified memory address. The L1 data cache 115 services this load request (possibly accessing the L2 cache 117 and lower levels of the memory system 101 if missed in the L1 data cache 115), and supplies the requested data to the execution/retire logic 109. The execution/retire logic 109 can also send a store request to the L1 data cache 115 to store data into the memory system at a specified address. The L1 data cache 115 services this store request by storing such data at the specified address (which possibly involves overwriting data stored by the data cache and lowering the stored data to the L2 Cache 117 and lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute, and retire as shown in FIG. 2.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution/retire logic 109.

In the issue stage, one or more operations as decoded by the decode stage are issued to the execution logic 109 and begin execution.

In the execute stage, issued operations are executed by the functional units of the execution/retire logic 109 of the CPU/Core 102.

In the retire stage, the results of one or more operations produced by the execution/retire logic 109 are stored by the CPU/Core 102 as transient result operands for use by one or more other operations in subsequent issue/execute cycles.

The execution/retire logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

During the execution of an operation by the execution logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

Figure 3:
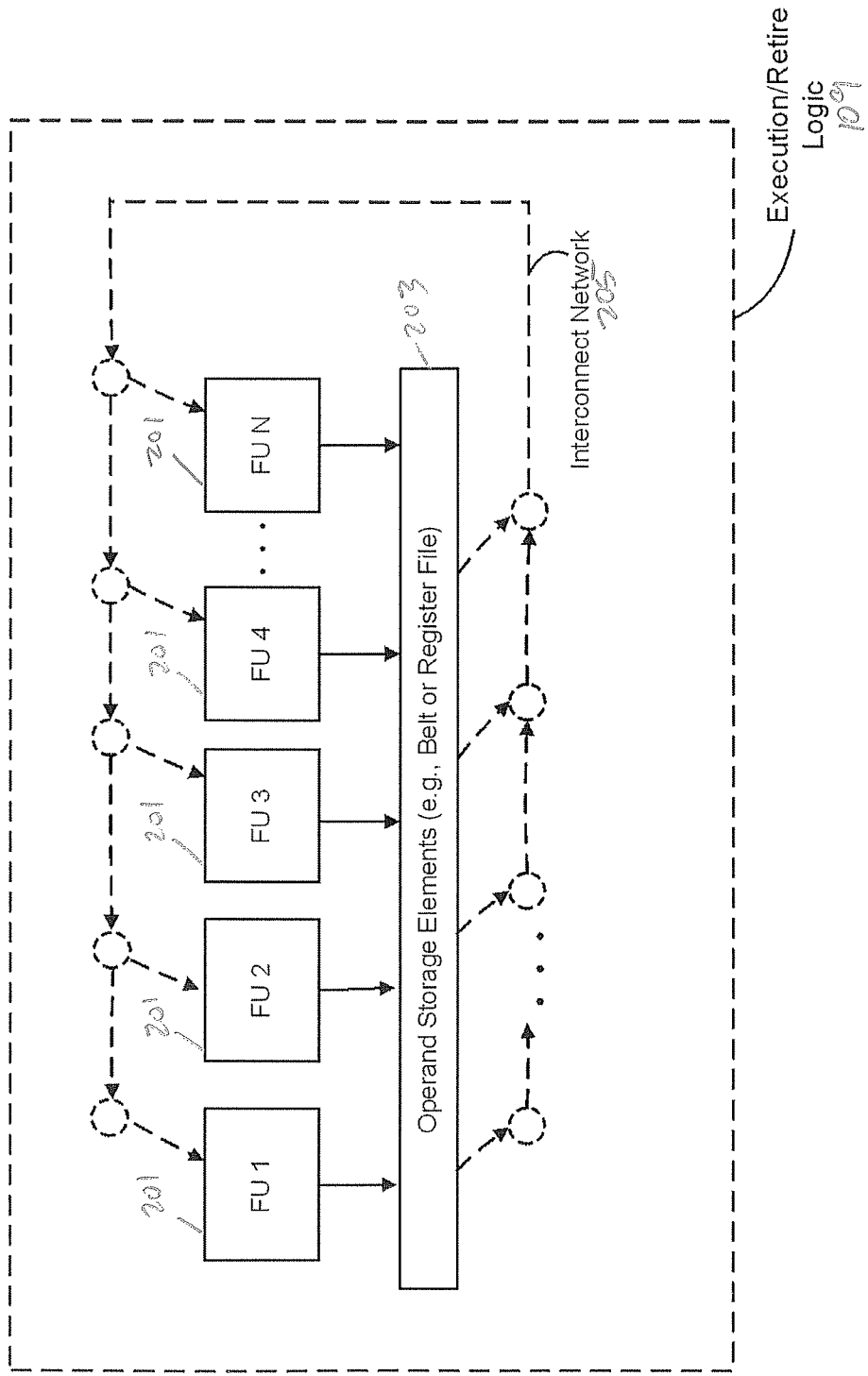
FIG. 3 is schematic illustration of components that can be part of the execution/retire logic of the computer processor of FIG. 1 according to an embodiment of the present disclosure.

FIG. 3 is a schematic diagram illustrating the architecture of an illustrative embodiment of the execution/retire logic 109 of the CPU/Core 102 of FIG. 1 according to the present disclosure, including a number of functional units 201. The execution/retire logic 109 also includes a set of operand storage elements 203 that are operably coupled to the functional units 201 of the execution/retire logic 109 and configured to store transient operands that are produced and referenced by the functional units of the execution/retire logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

Figure 4:
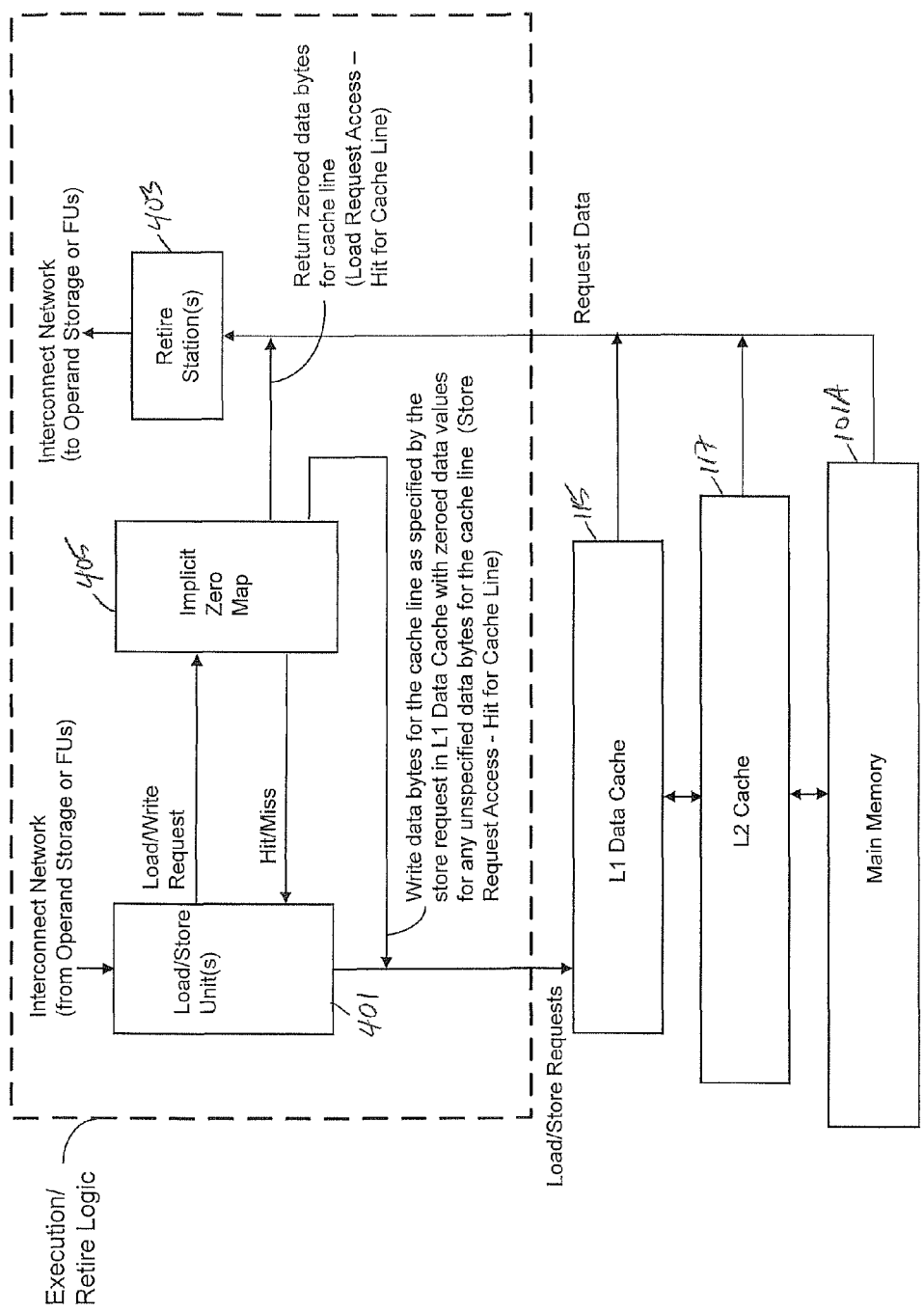
FIG. 4 is schematic illustration of components that can be part of the execution/retire logic and hierarchical memory system of the computer processor of FIG. 1 according to an embodiment of the present disclosure.

In one embodiment shown in FIG. 4, the memory hierarchy of the CPU/Core 102 includes several levels of cache, such as L1 data cache 115 (for example, with an access time of three machine cycles) and an L2 instruction/data cache 117 (for example, with an access time of 10 machine cycles), as well as main memory 101A (for example, with an access time of 400 machine cycles). Other memory hierarchy organizations and access times can also be used. The functional units of the execution/retire logic 109 include a load/store unit 401 as shown. Load operations are decoded by the decode stage 107 and issued for execution by the load/store unit 401, which issues a load request corresponding to the decoded load operation to the L1 Data Cache 115. The address for the load request can be provided directly from the machine code of the load operation. Alternatively, the address for the load request can be provided from the operand storage (via the interconnect network 205) at a reference specified by the machine code of the load operation. When "base+displacement" addressing is used, the base address can be stored in a special purpose register and the displacement offset relative to the base address can be provided from the operand storage (via the interconnect network 205) at a reference specified by the machine code of the load operation (or possibly directly from the machine code of the load operation). Likewise, the store operations are decoded by the decode stage 107 and issued for execution by the load/store unit 401, which issues a store request corresponding to the decoded store operation to the L1 Data Cache 115. The address for the store request can be provided directly from the machine code of the store operation.

Alternatively, the address for the store request can be provided from the operand storage (via the interconnect network 205) at a reference specified by the machine code of the store operation. When "base+displacement" addressing is used, the base address can be stored in a special purpose register and the displacement offset relative to the base address can be provided from the operand storage (via the interconnect network 205) at a reference specified by the machine code of the load operation (or possibly directly from the machine code of the load operation). The operand data for the store request can be provided from the operand storage (via the interconnect network 205) at a reference specified by the machine code of the store operation.

The execution/retire logic 109 also includes retire stations 403, which are hardware units that are able to hold the address of a load operation and possibly buffers the result data as it arrives from the memory hierarchy. The number of retire stations 403 can vary. Each retire station 403 is capable of handling one potential in-flight load operation. A load operation contains arguments that specify a memory address and possibly the width and scalarity of the desired data. Thus, a load operation may request to load a byte from address 0x123456789. The load operation is decoded and issued for execution by the load/store unit 401. When executing the load operation, the load/store unit 401 allocates a retire station 403 from the available pool of retire stations. The load/store unit 401 also sends the station number of the allocated retire station with the address and width as part of a load request to the L1 Data Cache.

Under normal operations (where there is no intervention from the operations of the IZM 405 as described herein), the load/store unit 401 issues load requests and the L1 data cache 115 services each load request by returning all (or part) of the requested data that hits in the L1 data cache 115 to the allocated retire station 403. If the requested data is not found (misses) in L1 data cache 115, the missing part(s) of the requested data are requested from the next level in the memory hierarchy (the L2 cache 117 and so on) until it is located and returned to the allocated retire station 403. The allocated retire station 403 can buffer the requested data, if need be. The retire station 403 can output the buffered requested data over the interconnect network 205 for storage in the operand storage 203 of the execution/retire logic 109, and then clears its state, and waits to be allocated again by another load operation.

Under normal operations (where there is no intervention from the operations of the IZM 405 as described herein), the load/store unit 401 issues store requests and the L1 data cache 115 services each store request by writing the data bytes of the requested cache line in the L1 data cache 115.

Figure 5:
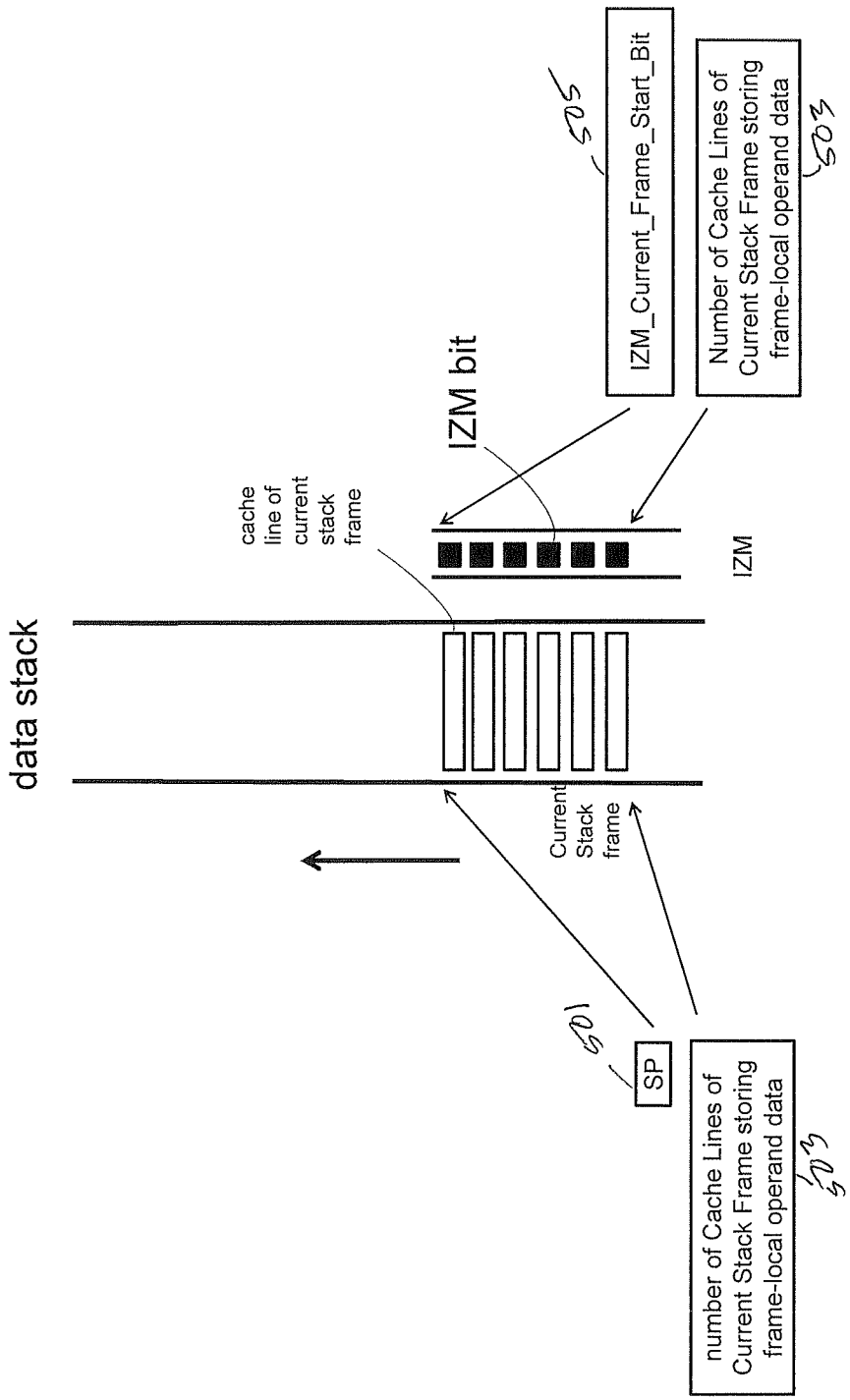
FIG. 5 is a schematic diagram of an exemplary data stack and an Implicit Zero Map (IZM) in accordance with the present disclosure.

The execution retire logic 109 also includes an Implicit Zero Map (IZM) 405, which interfaces to the load/store unit in order to receive data pertaining to each load request and store request that is to be issued by the load/store unit 401, where such data includes the address of the cache line of the given load or store request and possibly data that specifies that the request is either a load or store request. For a store request, the data also includes one or more operand data bytes that are to be written to the L1 data cache 115 by the store request. The IZM 405 includes a hardware map of entries that are single bits (i.e., a bit array) in which each entry (bit) corresponds to a cache line storing frame-local operand data for the current function frame activation (i.e., the frame-local operand data for the top stack frame) as shown in FIG. 5. The stack frame for the current function frame activation (the "current stack frame) is part of the data stack. The address space for the cache lines of the current data stack that store frame-local operand data is dictated by the address stored in the stack pointer (SP) register 501 and an offset stored in a special-purpose register 503 that represents the number of cache lines of the current stack frame that stores frame-local operand data. Furthermore, a number of bits of the hardware map of the IZM 504 are allocated to correspond to the cache lines that store frame-local operand data for the current function frame activation. The address space for these IZM entries (bits) is dictated by the address (index) stored in a special-purpose register 505 that points to the start IZM bit for the current function frame activation and the offset stored in a special-purpose register 503 that represents the number of cache lines of the current stack frame that stores frame-local operand data. The values for these special registers are updated according to the CALL operation that invokes the current function frame activation. In this manner, the cache lines mapped by the bits of the IZM 405 cover the address range that stores frame-local operand data for the current function frame activation.

The hardware map of the IZM 405 supports a fixed maximum number of bits, and the cache lines it maps may comprise an address region that is greater than or less than the size of the frame-local operand data of the top stack frame. If the address region of the cache lines storing frame-local operand data of the top stack frame is greater than the fixed maximum size of the hardware map of the IZM 405 then a portion of such address region is not mapped by the bits of the IZM 405. Otherwise, all cache lines storing frame-local operand data of the top stack frame are mapped by the bits of the IZM 405, and possibly all or a part of the cache lines for some lower stack frame can be mapped by the bits of the IZM 405.

The bits of the IZM 405 each correspond to a cache line storing frame-local operand data and provides an indication whether the corresponding cache line i) currently stores valid data in the memory hierarchy of the computer processing system and thus has a meaningful physical existence in the memory hierarchy, or ii) does not currently store valid data in the memory hierarchy of the computer processing system and should be interpreted as being implicitly zero throughout. In one embodiment, if an IZM bit is clear, then the corresponding cache line is interpreted as currently storing valid data in cache or a lower level of the memory hierarchy of the computer processing system and thus having a meaningful physical existence in the cache or lower level of the memory hierarchy of the computer processing system. However, if an IZM bit is set, then the corresponding cache line is interpreted as not currently storing valid data in cache or a lower level of the memory hierarchy of the computer processing system; instead the corresponding cache line is interpreted as being implicitly zero throughout.

Figure 6:
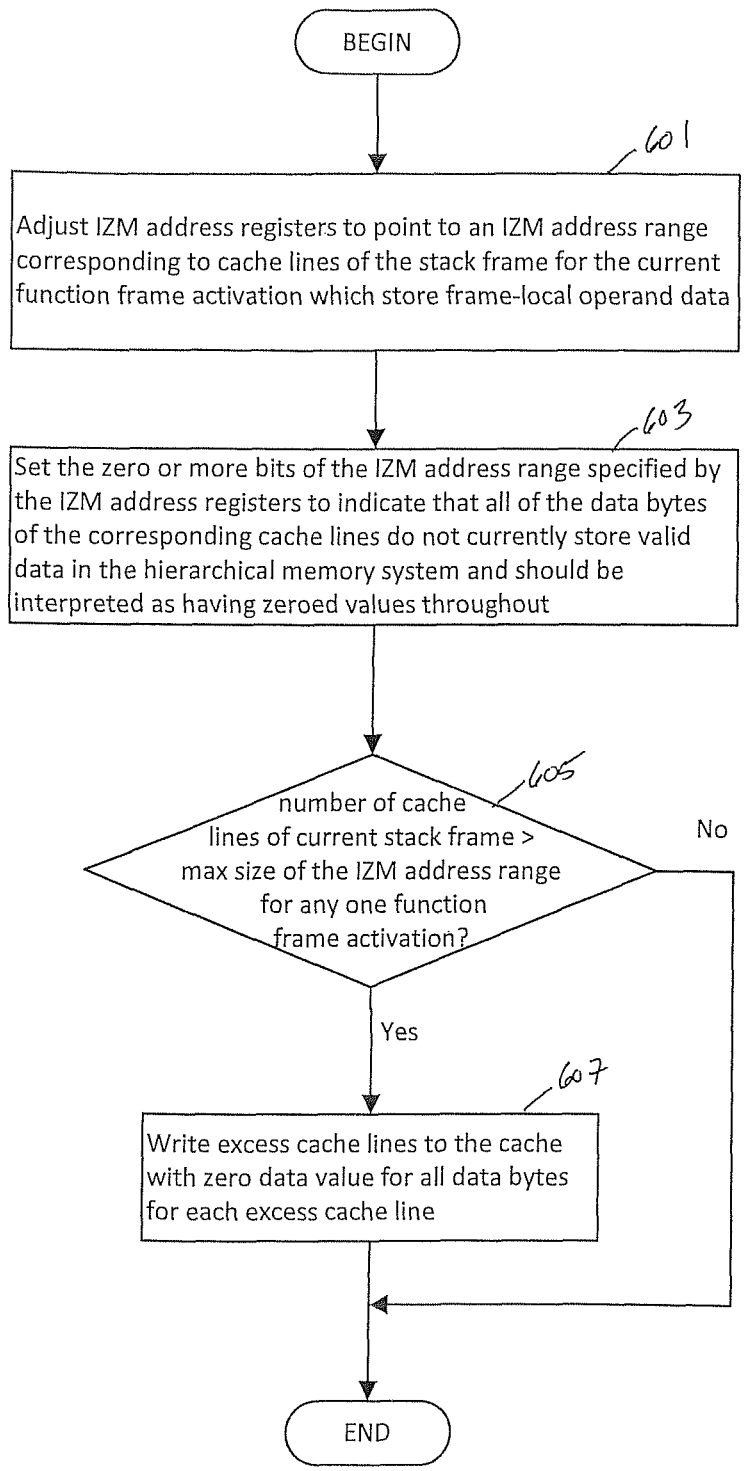
FIG. 6 is a flow chart that illustrates exemplary operations carried out by the computer processor in allocating entries (e.g., bits) of the IZM to the stack frame of the current function frame activation.

In one illustrative embodiment, the bits of the IZM 405 are allocated and mapped to the current function frame activation by a process outlined in the flow chart of FIG. 6. The operations begin in block 601 where the IZM address registers 505 and 503 are adjusted to point to an IZM address range corresponding to cache lines of the stack frame for the current function frame activation which store frame-local operand data.

In block 603, the bit(s) of the IZM address range specified by the IZM address registers 505 and 503 are set if need be in order to indicate that all of the data bytes of the corresponding cache line(s) of the current stack frame do not currently store valid data in the L1 data cache 115 (and in other parts of the memory hierarchy of the computer processing system) and should be interpreted as being implicitly zero throughout.

In block 605, it is determined if the number of cache lines of the current stack frame that stores frame-local operand data is greater than the maximum size of the IZM address range for any one particular function frame activation. If not, the operations end. Otherwise, the operations continue to block 607 where the excess cache lines (beyond the maximum size of the IZM address range) are written into the L1 data cache 115 with zero data values for all data bytes for each excess cache line.

Figure 7:
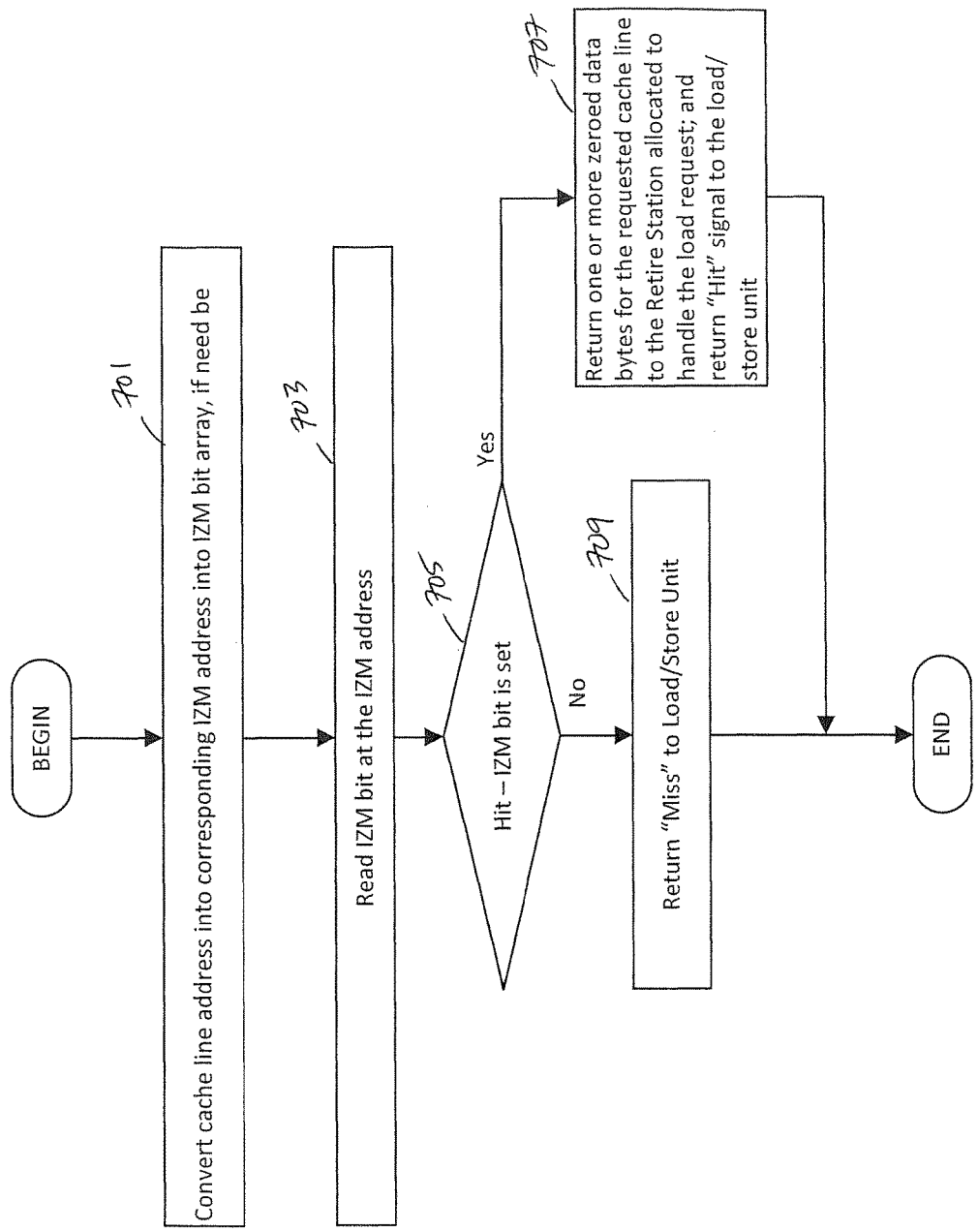
FIG. 7 is a flow chart that illustrates exemplary operations carried out by the computer processor in processing a load request generated by the load/store unit of the processor.

In one illustrative embodiment, each load request generated by the load/store unit 401 in a function frame activation is checked against the IZM 405 employing the operations of the flowchart of FIG. 7, which begins in block 701 where data pertaining to the load request is supplied to the IZM 405. Such data includes the address of the cache line of the given load request and possibly data that specifies that the request is a load request (in order to distinguish it from a store request) and possibly a station identifier for the retire station 403 that has been allocated to handle the load request. The address of the requested cache line of the load request is converted into a corresponding IZM address. Such conversion can involve subtracting the effective address of the load request from the base address of the IZM-covered region for the current function frame activation and then scaling the result by the width of a cache line.

In block 703, the bit of the IZM 405 at the IZM address generated in block 701 is read from the bit array of the IZM 405.

In block 705, it is determined whether the IZM bit read from the bit array of the IZM 405 in block 703 is set to indicate that all of the data bytes of the corresponding cache line(s) of the current stack frame do not currently store valid data in the L1 data cache 115 (and in other parts of the memory hierarchy of the computer processing system) and should be interpreted as being implicitly zero throughout. If so, the operations continue to 707. Otherwise, the operations continue to 709.

In block 707, the IZM 405 is configured to return one or more zeroed data bytes for the requested cache line to the Retire Station 403 allocated to handle the load request. Such retire station can be identified by a station identifier that is communicated from the load/store unit 401 to the IZM 405 in block 701. The IZM also returns a "Hit" signal to the load/store unit 401. When received, the "Hit" signal causes the load/store unit to intervene and discard the load request such that it is not issued to the L1 data cache 115. Note that in this case the load request is handled by the operations of the IZM 405 in block 707.

In block 709, the IZM 405 is configured to return a "Miss" signal to the load/store unit. When received, the "Miss" signal causes the load/store unit to issue the load request to the L1 data cache 115 as normal.

Figure 8:
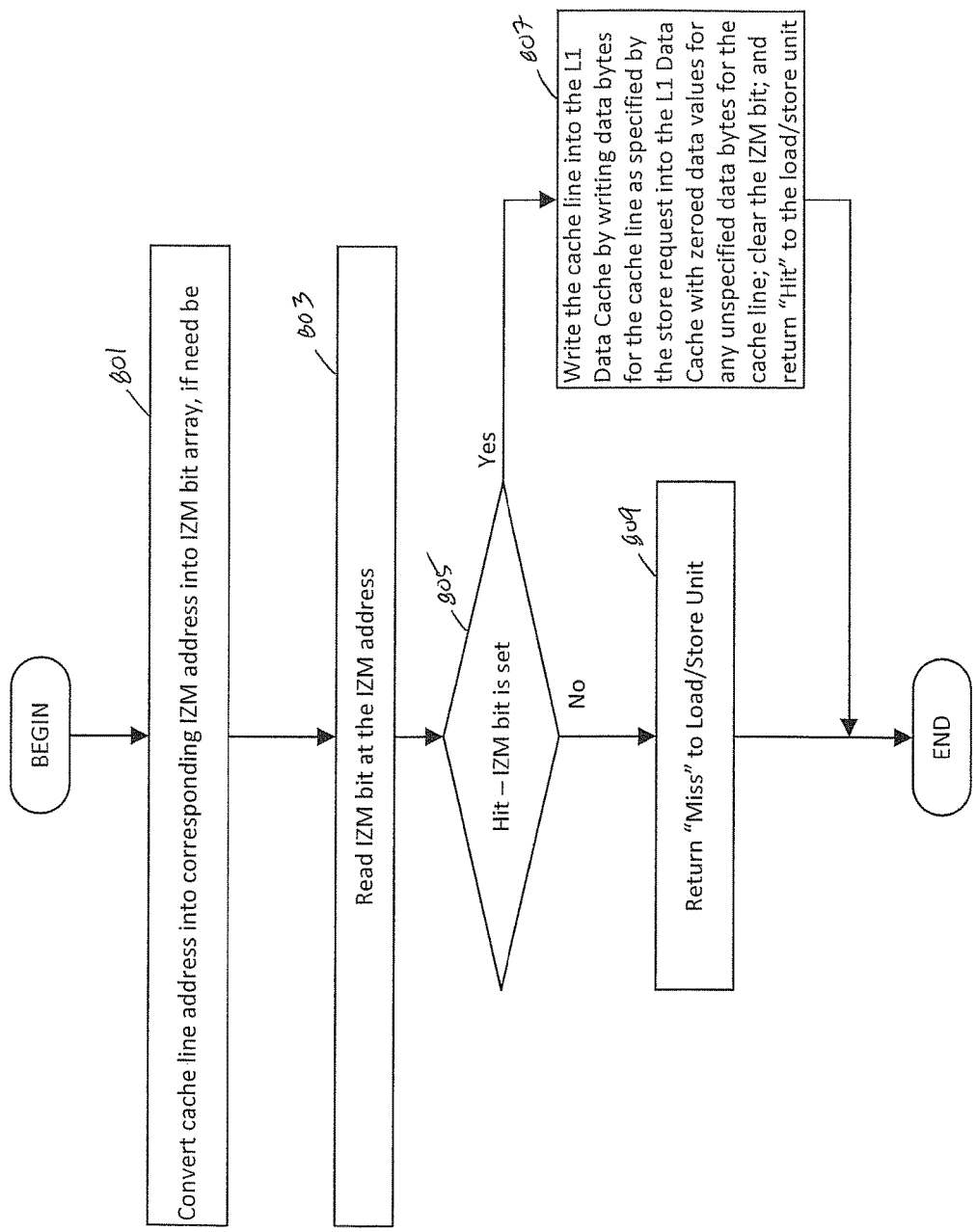
FIG. 8 is a flow chart that illustrates exemplary operations carried out by the computer processor in processing a store request generated by the load/store unit of the processor.

In one illustrative embodiment, each store request generated by the load/store unit 401 in a function frame activation is checked against the IZM 405 employing the operations of the flowchart of FIG. 8, which begins in block 801 where data pertaining to the store request is supplied to the IZM 405. Such data includes the address of the cache line of the given load request and possibly data that specifies that the request is a store request (in order to distinguish it from a load request). The data also includes one or more operand data bytes that are to be written to the L1 data cache 115 by the store request. The address of the requested cache line of the store request is converted into a corresponding IZM address. Such conversion can involve subtracting the effective address of the store request from the base address of the IZM-covered region for the current function frame activation and then scaling the result by the width of a cache line.

In block 803, the bit of the IZM 405 at the IZM address generated in block 801 is read from the bit array of the IZM 405.

In block 805, it is determined whether the IZM bit read from the bit array of the IZM 405 in block 803 is set to indicate that all of the data bytes of the corresponding cache line(s) of the current stack frame do not currently store valid data in the L1 data cache 115 (and in other parts of the memory hierarchy of the computer processing system) and should be interpreted as being implicitly zero throughout. If so, the operations continue to 807. Otherwise, the operations continue to 809.

In block 807, the IZM 405 is configured to write the cache line into the L1 Data Cache 115 by writing the data bytes for the cache line as specified by the store request into the L1 Data Cache with zeroed data values for any unspecified data bytes for the cache line. Furthermore, the IZM bit corresponding to the cache line is cleared to indicate that the cache line currently stores valid data in the L1 data cache 115 (and thus has a meaningful physical existence in the memory hierarchy of the computer processing system). A cache line can be displaced by writing the cache line as specified by the store request. Furthermore, the IZM 405 returns a "Hit" signal to the load/store unit 401. When received, the "Hit" signal causes the load/store unit to intervene and discard the store request such that it not issued to the L1 data cache 115. Note that in this case the store request is handled by the operations of the IZM 405 in block 807.

In block 809, the IZM 405 is configured to return a "Miss" signal to the load/store unit. When received, the "Miss" signal causes the load/store unit to issue the store request to the L1 data cache 115 as normal.

Figure 9:
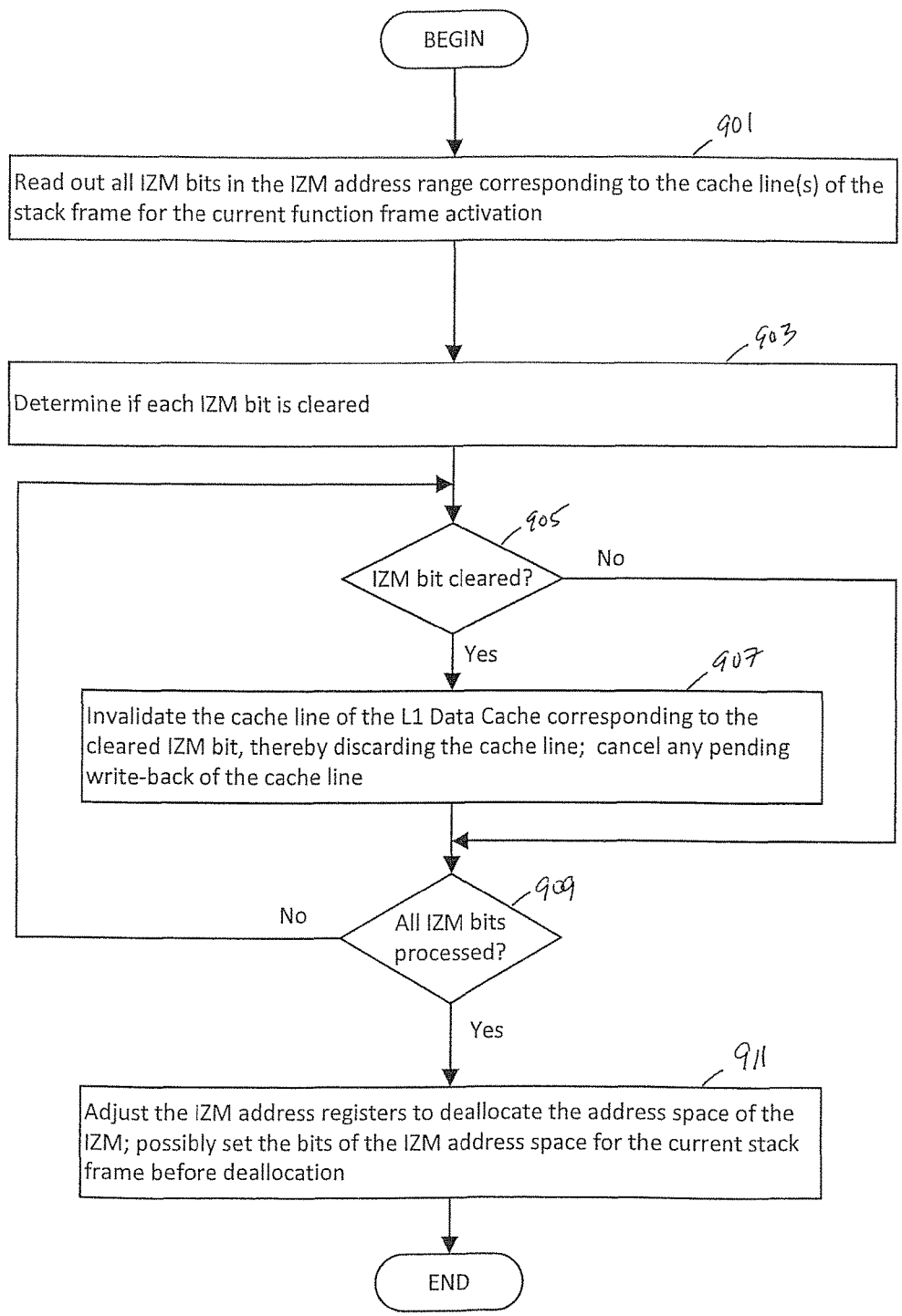
FIG. 9 is a flow chart that illustrates exemplary operations carried out by the computer processor in deallocating entries (bits) of the IZM with respect to the stack frame of the current function frame activation.

In one illustrative embodiment, the bits of the IZM 405 are deallocated and unmapped from the current function frame activation by a process outlined in the flow chart of FIG. 9, which begins in block 901 where all IZM bits within the IZM address range corresponding to the cache line(s) of the data stack for the current function frame activation are read out from the bit array of the IZM 405.

In blocks 903 to 907, the bit(s) of the bit array of the IZM 405 read out in block 901 are processed bit-by-bit.

In block 903 and 905, it is determined if the respective IZM bit is cleared and thus indicates that the cache line currently stores valid data in the memory hierarchy of the computer processing system (and thus has a meaningful physical existence in the memory hierarchy of the computer processing system). If so, the operations continue to 907; otherwise, the operations continue to 909.

In block 907, the cache line of the L1 data cache corresponding to the respective IZM bit is invalidated. And any pending write-back operation of this cache line is cancelled.

In block 909, it is determined whether all of the IZM bits read out from the bit array of the IZM 405 in block 901 have been processed by the operations of clocks 903 to 907. If not, the operations return to continue such operations. If so, the operations continue to block 911.

In block 911, the IZM address registers 505 and 503 are adjusted to deallocate the address space of the IZM for the current function frame activation. Moreover, before such deallocation, the bits of the IZM address space corresponding to the current function frame activation can be set for initialization and use in one or more subsequent function frame activations as needed.

It is contemplated that the operations of the IZM can readily be extended to operate in a multiprocessor shared-memory system (such as a multicore processor chip) or a multitasking environment operating on a single processor. Specifically, if all of the five following conditions hold:

1) the cache line address is covered by the IZM;
2) the entry (e.g., bit) of the bit array of the IZM corresponding to the cache line address is set to a binary level that indicates that the cache line does not currently store valid data in the memory hierarchy of the computer processing system but is implicitly zero throughout;
3) the cache line address can be passed to another processor executing in parallel or to a different task in the same processor after a task swap (a pointer escape);
4) the pointer may then be dereferenced by the other processor or task; and
5) the machine definition requires that the result of the dereference (on a load) or change to memory (on a store) be well defined;

then the corresponding cache line(s) can be realized so that the other processor or task see a physical zero for all of the data bytes of the cache line. In general, the IZM hardware mechanism will not, and the compiler may not, know that a pointer escape is possible. A combination of automatic and/or compiler controlled realizations can conservatively defend against this possibility.

Furthermore, the IZM mechanism as described above can be used in conjunction with hardware that realizes implicitly zero lines from the IZM as a background process, using spare cache bandwidth as available. The effect of such background realization is to reduce the flurry of realizations that occur with each call in a deeply nested sequence of calls with large frame sizes, where each function calls the next before doing much initialization of its own frame.

Furthermore, the IZM mechanism as described above can be used in conjunction with hardware that invalidates realized lines in exited frames as a background process, using spare cache bandwidth as available. The effect of such background invalidation is to reduce the flurry of invalidations that occur with each return from a deeply nested sequence of calls with large frame sizes, where each function had significantly realized lines in its own frame. An exit followed by another call may leave the IZM referring to a line that is still queued for invalidation in the background invalidator. If that line is realized without removing it from the invalidator then the realization could be lost. Loss may be avoided by causing the call (and new frame allocation) to discard any pending invalidations in the new frame region; by having realization check for pending invalidation of the same line; by having invalidation check for prior realization of the same line in the current IZM; or by other evident means.

While the embodiments of the present disclosure is described above in terms of a stack frame, it is evident that the features and operations can readily be adapted to be performed in conjunction with other operational states of a CPU that have a high density of allocation and deallocation of memory.

Furthermore, as described herein, the IZM is configured to filter memory requests for access to the top level cache of the hierarchical memory system. In an alternate embodiment, it can readily be adapted to filter memory requests that access lower levels of the hierarchical memory system, such as access to the L2 cache and/or to higher level cache or to main memory if desired.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the micro-architecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processor for use with a hierarchical memory system that includes at least one level of cache memory and main memory, the computer processor comprising:

execution logic that generates memory requests that are supplied to the hierarchical memory system, wherein the execution logic includes a hardware map storing a number of entries associated with corresponding units of memory, where each given entry of the hardware map indicates whether a corresponding unit of memory i) currently stores valid data in the hierarchical memory system, or ii) does not currently store valid data in the hierarchical memory system and should be interpreted as being implicitly zero throughout, wherein the memory requests include a load request specifying a memory address, and the hardware map is accessed in conjunction with servicing the load request in order to determine if the hardware map includes an entry that corresponds to the memory address of the load request;

wherein the entry that corresponds to the memory address of the load request is processed to determine whether the corresponding unit of memory i) currently stores valid data in the hierarchical memory system, or ii) does not currently store valid data in the hierarchical memory system of the computer processing system and should be interpreted as being implicitly zero throughout; and wherein, in the event that the processing determines that the corresponding unit of memory does not currently store valid data in the hierarchical memory system and should be interpreted as being implicitly zero throughout, a zero value for one or more data bytes is returned to the execution logic while avoiding memory access in servicing the load request.

2. A computer processor according to claim 1, wherein:
the address of the load request refers to a requested cache line; and
the hardware map is accessed before issuing the load request to the hierarchical memory system in order to determine if the hardware map includes an entry that corresponds to the requested cache line of the load request.

3. A computer processor according to claim 2, wherein:
the entry that corresponds to the requested cache line of the load request is processed to determine whether the requested cache line i) currently stores valid data in the hierarchical memory system, or ii) does not currently store valid data in the hierarchical memory system of the computer processing system and should be interpreted as being implicitly zero throughout.

4. A computer processor according to claim 3, wherein:
in the event that the processing determines that the requested cache line does not currently store valid data in the hierarchical memory system and should be interpreted as being implicitly zero throughout, a cache line with a zero value for one or more data bytes is returned to the execution logic while avoiding memory access in servicing the load request.

5. A computer processor according to claim 1, wherein:
the memory requests further include a store request specifying a memory address along with one or more operand data bytes for storage at such memory address;
the hardware map is accessed in conjunction with servicing the store request in order to determine if the hardware map includes an entry that corresponds to the memory address of the store request;
the entry that corresponds to the memory address of the store request is processed to determine whether the corresponding unit of memory i) currently stores valid data in the hierarchical memory system, or ii) does not currently store valid data in the hierarchical memory system of the computer processing system and should be interpreted as being implicitly zero throughout; and
in the event that the processing determines that the corresponding unit of memory does not currently store valid data in the hierarchical memory system and should be interpreted as being implicitly zero throughout, the operand data bytes specified by the store request are combined with zero or more data bytes of zero value and the resulting data bytes are written into the hierarchical memory system at the memory address of the store request.

6. A computer processor according to claim 5, wherein:
the address of the load request references a requested cache line; and
the entry that corresponds to the requested cache line of the store request is processed to determine whether the requested cache line i) currently stores valid data in the hierarchical memory system of the computer processing system, or ii) does not currently store valid data in the hierarchical memory system of the computer processing system and should be interpreted as being implicitly zero throughout.

7. A computer processor according to claim 6, wherein:
in the event that the processing determines that the requested cache line does not currently store valid data in the hierarchical memory system and should be interpreted as being implicitly zero throughout, a new cache line is written into the hierarchical memory system, wherein the new cache line includes the operand data bytes specified by the store request together with zero value data bytes for those data bytes of the cache line not specified by the store request.

8. A computer processor according to claim 1, wherein:
the units of memory corresponding to certain entries of the hardware map store frame-local operand data for a stack frame of a current function frame activation.

9. A computer processor according to claim 8, wherein:
during an allocation process associated with the current function frame activation, one or more entries of the hardware map that corresponds to cache lines that store frame-local operand data for the stack frame of the current function frame activation are initialized to indicate that such cache lines do not currently store valid data in cache or a lower level of the hierarchical memory system of the computer processing system and should be interpreted as being implicitly zero throughout.

10. A computer processor according to claim 9, wherein:
in the event that the number cache lines that store frame-local operand data for the stack frame of the current function frame activation exceeds the maximum number of entries of the hardware map that can be allocated for the current function frame activation, each excess cache line is written to the hierarchical memory system with a zero value throughout.

11. A computer processor according to claim 8, wherein:
the hardware map is accessed in conjunction with servicing a function frame activation in order to determine if the hardware map includes an entry that corresponds to units of memory of the function frame activation.

12. A computer processor according to claim 8, wherein:
the hardware map is accessed when terminating the function frame activation in order to identify one or more cache lines that currently store frame-local operand data for the function frame activation.

13. A computer processor according to claim 12, wherein:
the identified one or more cache lines are invalidated within the hierarchical memory system when terminating the function frame activation.

14. A computer processor according to claim 12, wherein:
any pending write-back of the identified one or more cache lines within the hierarchical memory system is cancelled when terminating the function frame activation.

15. A computer processor according to claim 1, wherein:
the entries of the hardware map each comprise a single bit associated with a corresponding cache line.

16. A computer processing system comprising:
a hierarchical memory system that includes at least one level of cache memory and main memory; and
execution logic that generates memory requests that are supplied to the hierarchical memory system, wherein the execution logic includes a hardware map that is configured to selectively filter access to at least one level of the hierarchical memory system, wherein the hardware map stores a number of entries associated with corresponding units of memory, where each given entry of the hardware map indicates whether a corresponding unit of memory i) currently stores valid data in the hierarchical memory system and should be interpreted as being implicitly zero throughout;
wherein the memory requests include a load request specifying a memory address, and the hardware map is accessed in conjunction with servicing the load request in order to determine if the hardware map includes an entry that corresponds to the memory address of the load request;
wherein the entry that corresponds to the memory address of the load request is processed to determine whether the corresponding unit of memory i) currently stores valid data in the hierarchical memory system, or ii) does not currently store valid data in the hierarchical memory system of the computer processing system and should be interpreted as being implicitly zero throughout; and wherein, in the event that the processing determines that the corresponding unit of memory does not currently store valid data in the hierarchical memory system and should be interpreted as being implicitly zero throughout, a zero value for one or more data bytes is returned to the execution logic while avoiding memory access in servicing the load request.

17. A computer processing system according to claim 16, wherein:

the address of the load request references a requested cache line; and the hardware map is accessed before accessing the hierarchical memory system as specified by the address of the load request in order to determine if the hardware map includes an entry that corresponds to the requested cache line of the load request.

18. A computer processing system according to claim 17, wherein:

the entry that corresponds to the requested cache line of the load request is processed to determine whether the requested cache line i) currently stores valid data in the hierarchical memory system, or ii) does not currently store valid data in the hierarchical memory system of the computer processing system and should be interpreted as being implicitly zero throughout.

19. A computer processing system according to claim 18, wherein:

in the event that the processing determines that the requested cache line does not currently store valid data in the hierarchical memory system and should be interpreted as being implicitly zero throughout, a cache line with a zero value for one or more data bytes is returned to the execution logic while avoiding access to memory in servicing the load request.

20. A computer processor according to claim 16, wherein:

the entries of the hardware map each comprise a single bit associated with a corresponding cache line.

\* \* \* \* \*